United States Patent
Farr

[11] 3,915,265
[45] Oct. 28, 1975

[54] INTERNAL SHOE-DRUM BRAKES
[75] Inventor: Glyn Phillip Reginald Farr, Warwick, England
[73] Assignee: Girling Limited, Birmingham, England
[22] Filed: June 17, 1974
[21] Appl. No.: 480,102

[30] Foreign Application Priority Data
June 16, 1973 United Kingdom............... 28723/73

[52] U.S. Cl................... 188/79.5 GC; 188/196 BA
[51] Int. Cl.²......................................... F16D 65/56
[58] Field of Search..188/79.5 GC, 79.5 K, 79.5 SC, 188/196 D, 196 BA

[56] References Cited
UNITED STATES PATENTS

| | | | |
|---|---|---|---|
| 1,824,552 | 9/1931 | Khezarjian | 188/79.5 GC |
| 1,954,540 | 4/1934 | Sanford | 188/79.5 GC |
| 3,184,008 | 5/1965 | Winge et al. | 188/79.5 GC |
| 3,381,779 | 5/1968 | Newstead | 188/79.5 SC |
| 3,780,836 | 12/1973 | Newstead | 188/196 BA X |

*Primary Examiner*—Duane A. Reger
*Attorney, Agent, or Firm*—Scrivener Parker Scrivener and Clarke

[57] ABSTRACT

An internal shoe-drum brake incorporates a flexible inextensible cable acting between shoe-engaging separable tappets of an actuator, and the cable transmits relative movement between the tappets to a slack adjuster to store energy in a spring embodied in the adjuster when the brake is applied. The slack adjuster is of the differential thread type and acts between adjacent non-actuated shoe-ends. The effective length of the adjuster can be increased to compensate for wear of the shoe linings when the energy stored in the spring is released at the termination of a brake application.

12 Claims, 13 Drawing Figures

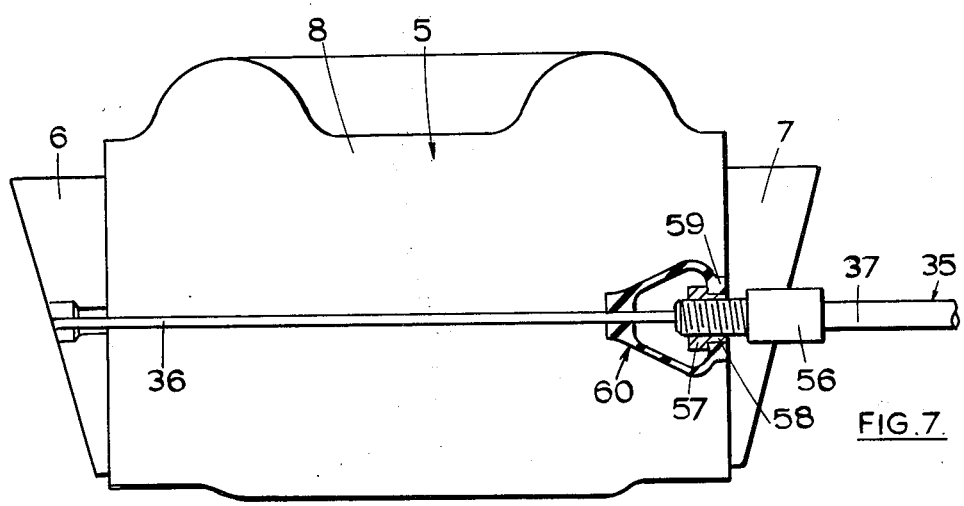
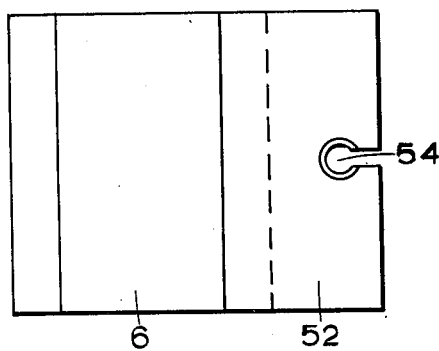
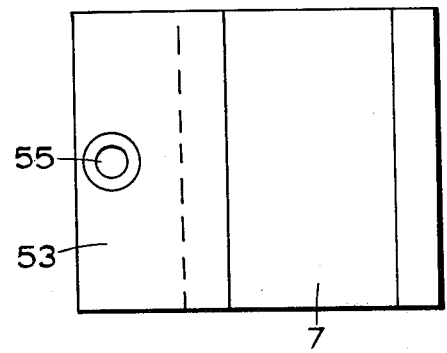
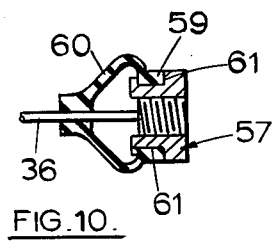
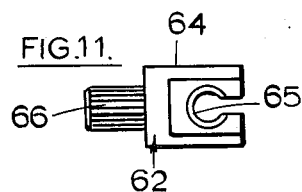
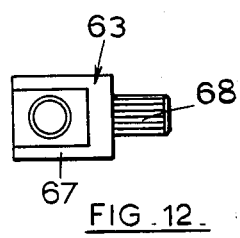
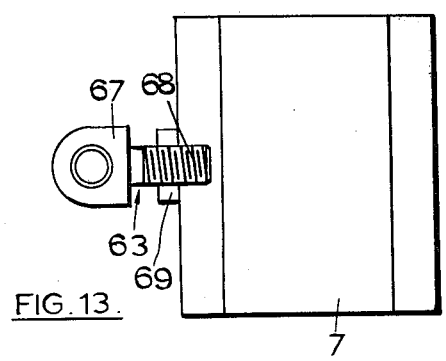

INTERNAL SHOE-DRUM BRAKES

This invention relates to internal shoe-drum brakes of the kind in which arcuate shoes carrying friction linings for engagement with a rotatable drum are adapted to be separated at adjacent ends by an actuator, and an adjuster with which the opposite or non-actuated adjacent shoe-ends engage is adapted to adjust the spacing between the opposite or non-actuated shoe-ends to compensate for wear of the friction linings.

In internal shoe-drum brakes of the kind set forth it is known to include transmission means for operating the adjuster. In one construction the transmission means sense relative movement between the shoes with respect to the drum and operate the adjuster when such relative movement exceeds a predetermined value. Such relative movement may not depend entirely upon wear having taken place, and can be influenced by the shoes moving circumferentially within the drum as a result of adjustment.

According to one feature of our invention, an internal shoe-drum brake of the kind set forth incorporates transmission means for operating the adjuster, the transmission means being arranged to sense relative movement between parts of the actuator which act on the shoes and separate adjacent shoe-ends in the application of the brake.

Sensing relative movement between parts of the actuator provides a direct reading of actuator movement to operate the adjuster when this movement exceeds a predetermined value, irrespective of other factors.

When the actuator comprises a pair of tappets acting on the shoes and adapted to be separated by a rotatable cam, the tappets are guided to slide in a housing and the transmission means are carried by, and sense relative movement between, the tappets.

This has the advantage that the shoes can be replaced without disturbing the transmission means.

In one construction the transmission means comprises a flexible inextensible member, conveniently a cable assembly, connected between the parts of the actuator with the free end of the cable assembly being adapted to operate the adjuster to maintain the braking clearances at a constant value when movement of the member exceeds a predetermined value.

The adjuster may be of the differential thread type incorporating a threaded worm wheel which is rotatable in response to movement of the inextensible member to cause simultaneous movement in opposite directions of a pair of abutment members with which the non-actuated or opposite shoe-ends engage.

According to another feature of our invention an adjuster for the shoes of a shoe-drum brake of the kind set forth comprises a housing adapted to be mounted on a back-plate between non-actuated shoe-ends, a screw-threaded assembly located within the housing and adapted to act on the shoe-ends, and adjusting means for increasing the effective length of the assembly to compensate for wear of the friction linings, the adjusting means comprising a worm meshing with the screw-threaded assembly and rotatable within the housing, an adjuster member rotatable relative to the worm in the application of the brake from an initial datum position and coupled thereto by a clutch plate keyed to the worm and relative to which the adjuster member is rotatable in one direction, resilient means for urging into engagement interengaging teeth in adjacent faces at the adjuster member and the clutch plate, the spacing between adjacent pairs of teeth corresponding to braking clearances, and energy storing means for returning the adjuster member to the initial datum position at the termination of the brake application, rotating the worm to increase the effective length of the assembly if the movement of adjuster member with respect to the clutch plate has exceeded the spacing between adjacent teeth.

Conveniently the worm is accessible from one end of the housing so that by rotating it manually the effective length of the screw-threaded assembly can be decreased to facilitate drum removal. Initial rotation of the worm moves the clutch plate and the worm axially away from the adjuster member until movement of the worm in that direction is arrested by a stop, further rotation thereafter causing relative rotation of the members of the screw-threaded assembly to decrease the effective length thereof.

Some embodiments of our invention are illustrated in the accompanying drawings in which:

FIG. 7 is a view of the actuator showing a connection between the cable assembly and the tappets;

FIG. 8 is a view of one end of the actuator of FIG. 7;

FIG. 9 is a view of the opposite end of the actuator;

FIG. 10 is a modified connection between the cable assembly and one tappet;

FIG. 11 shows another tappet connection for one end of the cable assembly;

FIG. 12 shows another tappet connection for the other end of the cable assembly; and FIG. 13 is similar to FIG. 12 but showing a modification.

Figure 1:
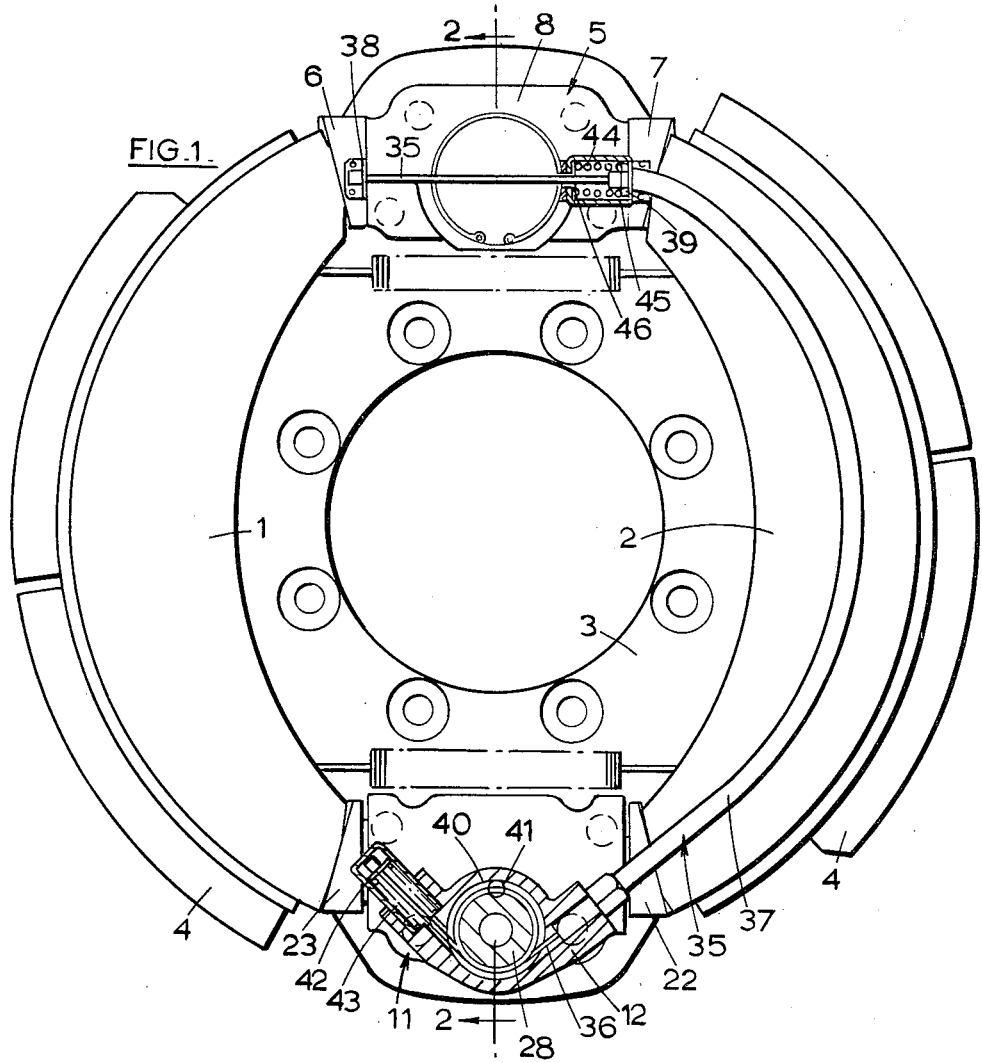
FIG. 1 is a plan view of an internal shoe-drum brake with the drum omitted for clarity and including a section on the line 1—1 of FIG. 2.
Figure 3:
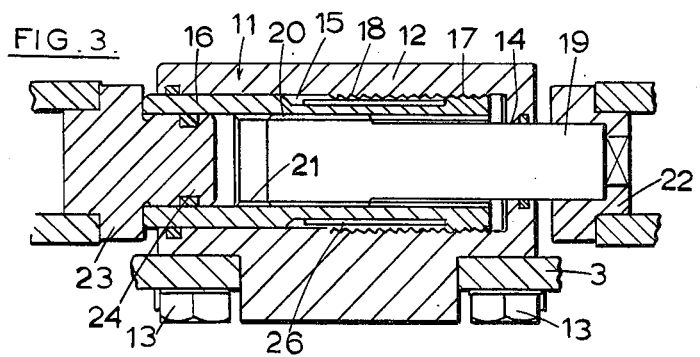
FIG. 3 is a section on the line 3—3 of FIG. 2.
Figure 2:
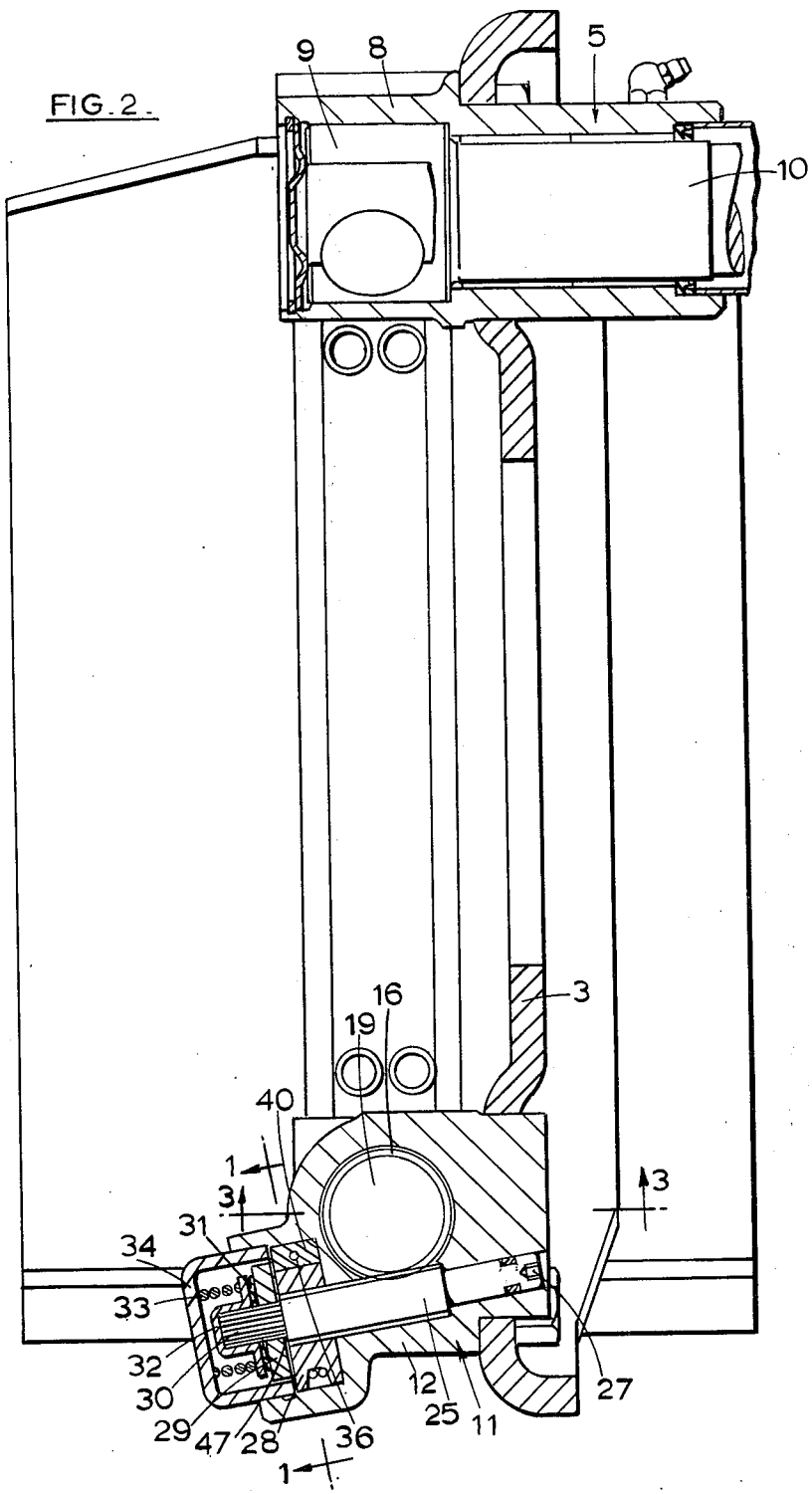
FIG. 2 is a section on the line 2—2 of FIG. 1.

The internal shoe-drum brake illustrated in the drawings is of the one-leading, one-trailing type comprising shoes 1 and 2 which are mounted on a stationary rigid back-plate 3 and carry friction linings 4 for engagement with a rotatable drum (not shown).

At their actuated ends the shoes 1 and 2 are adapted to be separated by an actuator 5 comprising opposed tappets 6 and 7 which engage with the shoe ends. The tappets 6 and 7 are guided to slide in a housing 8 mounted on the back plate 3 and are movable in opposite directions in response to rotation of a cam 9 carried at the inner end of a shaft 10 which is journalled in the housing 8.

The non-actuated or opposite ends of the shoes 1 and 2 engage with an adjuster 11 mounted on the back-plate 3. The aduster 11 comprises a housing 12 fixed to the back-plate 3 by means of bolts 13. The housing 12 has a longitudinally extending bore 14 which is counterbored at 15 for a major portion of its length. A worm wheel in the form of a sleeve 16 is housed within the counterbore 15. At its inner end the sleeve 16 is provided with a screw-threaded portion 17 for engagement with complementary screw-threads 18 at the inner end of the counterbore 15. A spindle 19 extending into the housing 12 through the bore 14 has a screw-threaded portion 20 at its inner end which is threadably engaged with an internal screw-thread 21 of the sleeve 16.

A tappet 22 rigid with or fixedly secured to the outer end of the spindle 19 is received between spaced flanges of the trailing shoe 2, and a tappet 23 received between spaced flanges of the leading shoe 1 has a circular inner end portion 24 received within the adjacent end of the sleeve 16 which is rotatable relative thereto.

The axis of the bore 14 is chordal with respect to the brake and a worm 25 inclined with respect to the axis of the brake and journalled for rotation in the housing 12 meshes with teeth 26 comprising an intermediate portion in the outer surface of the sleeve 16. The teeth 26 are arranged to ensure that the worm 25 can mesh with them for the full travel of the sleeve 16. One end portion of the worm 25 which is of reduced diameter is provided with a screw-driver slot 27 by means of which the worm 25 can be rotated from the back-plate 3. A drum 28 is rotatably mounted on the opposite inner end of the worm 25 and a clutch plate 29 mounted for sliding movement on a splined extension 30 of reduced diameter on the worm 25 is urged into engagement with the end face of the drum 28 by means of a blade spring 31 acting between the clutch plate 29 and an abutment cap 32. The abutment cap 32 encloses the free end of the splined extension 30 and is maintained in position by means of a compression spring 33 acting between the abutment cap 32 and an end closure 34.

The clutch plate 29 and the drum 28 are provided in their mating faces with complementary interengaging teeth permitting relative rotation therebetween in one direction only and the space between adjacent teeth is chosen so as to correspond to the desired braking clearances.

An inextensible circumferentially extending cable assembly 35 is connected between the actuator 5 and the adjuster 11. The cable assembly comprises an inner cable 36 slidably enclosed within a flexible casing 37. One end of the cable 36 acts on a bracket 38 connected to the tappet 6 and the corresponding end of the casing 37 acts on a similar bracket 39 which is connected to the tappet 7. The opposite end of the casing 37 abuts against the housing 12 of the adjuster 11, and the cable 36 extends through the housing 12 and completes one complete turn of the drum 28 with opposite end portions being in tangential engagement with the surface of the drum 28 over an arc subtended by an angle of substantially 90° at the axis of the drum. A cylindrical fitting 40 swaged to the cable 36 is received in a radial notch 41 in the peripheral edge of the drum 28 to anchor the cable 36 and the drum 28 against relative movement. The free end of the cable 36 carries an abutment plate 42 which is guided to slide in the housing 12 and on which acts a compression spring 43 to hold the cable in engagement with the drum 28 and urge the tappets 6 and 7 into retracted positions.

When the brake is applied and the tappets 6 and 7 move away from each other to separate the actuated shoe ends, the cable 36 and the casing 37 move relative to each other in opposite directions. The provision of the fitting 40 transmits movement of the cable 36 to the drum 28 to rotate the drum 28 with respect to the stationary clutch plate 29 away from a datum position, at the same time compressing the spring 43. On release of the brake, the axial force from the spring 43 causes the drum 28 to rotate in the opposite direction to restore it to its initial datum position with the interengaging teeth in engagement. This then precludes further rotation of the drum 28 in that reverse direction.

When the relative movement between the drum 28 and the clutch plate 29 in the application of the brake exceeds the spacing between adjacent teeth, upon release of the brake the stored energy in the compression spring 43 applies to the drum 28 a force of sufficient magnitude to rotate the worm 25, which in turn rotates the sleeve 16 to cause movement of the tappets 22 and 23 in opposite directions away from each other. This advances the shoes 1 and 2 towards the drum to compensate for wear of the friction linings and maintain the braking clearances at a constant value.

In a modification, as illustrated in the drawings, a second compression spring 44 acts between an abutment plate 45 at one end of the flexible casing 37 and an abutment 46 rigid with and spaced from the bracket 39 to urge the abutment plate 45 against the bracket 39. The engagement between the teeth on the drum 28 and on the clutch plate 29 is reversed. Thus, the drum rotates with respect to the clutch plate in a reverse direction.

In operation of the modified construction, rotary movement of the drum 28 is transmitted to the worm 25 which tends to rotate the sleeve 16 to urge the tappets 22 and 23 away from each other. When the load in the screw-threads becomes excessive, it is transmitted through the cable assembly 35 to compress the second compression spring 44 by the abutment plate 45 moving away from the bracket 39. Upon release of the brake, the stored energy in the spring 46 is effective to rotate the drum 28 in the opposite direction and over one tooth between the drum 28 and the clutch plate 29. Thus, adjustment to compensate for wear of the friction linings will take place in the application of the brake and on the next brake application with the drum 28 rotating the worm 25 without the load in the screw-threads becoming excessive.

To replace brake shoes should grooves have been worn in the drum, it is convenient to wind back the adjuster 11 by the use of the slot 27. As the worm 25 is rotated it moves axially since the resistance to movement of the worm in this direction is less than the friction between the sleeve 16 and the housing 12. This causes a shoulder 47 at a step in diameter between the worm 25 and the splined extension 30 to disengage the clutch plate 29 from the drum 28. Axial movement of the worm 25 continues until the abutment cap 32 engages with the end closure 34 which acts as a stop to preclude further axial movement of the worm in that direction. Thereafter subsequent rotation of the worm 25 develops a torque to overcome the friction between the sleeve 16 and the housing 12 and the sleeve 16 is rotated in a direction to decrease the effective length of the adjuster 11 to increase the braking clearances and enable the drum to be removed.

Figure 4:
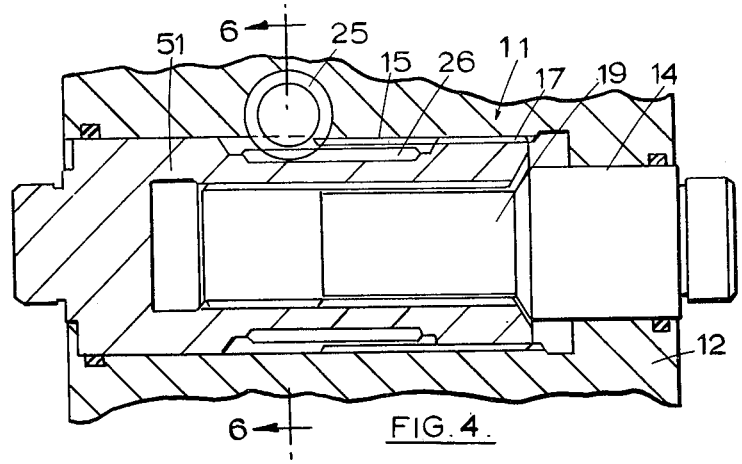
FIG. 4 is a view similar to FIG. 3 of a modified adjuster in a retracted position.
Figure 5:
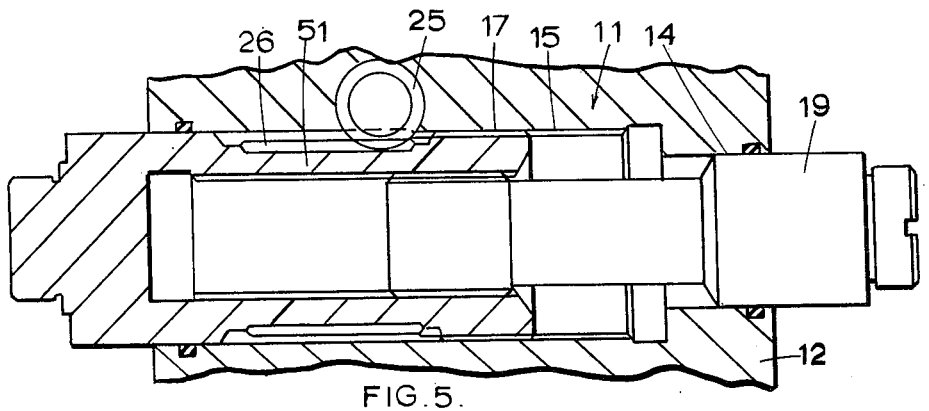
FIG. 5 shows the adjuster in an extended position.
Figure 6:
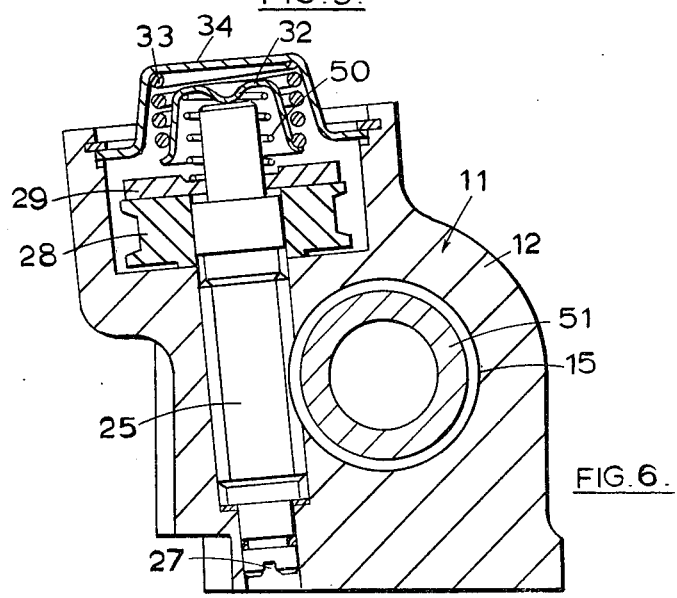
FIG. 6 is a section on the line 6—6 of FIG. 4.

In the modified adjuster 11 illustrated in FIGS. 4 to 6 of the drawings the blade spring 31 is replaced by a compression spring 50 acting between the clutch plate 29 and the inner face of the abutment cap 32. The sleeve 16 and the tappet 23 are combined into a single component 51.

The construction and operation of the modified adjuster is otherwise the same as that described above and corresponding reference numerals have been applied to corresponding parts.

FIGS. 7 to 13 illustrate various means of connecting the cable assembly 35 to the tappets 6 and 7.

In the construction illustrated in FIGS. 7 to 9 each tappet 6 and 7 is provided with a lug 52, 53 respectively which projects in an axial direction beyond the face of the housing 8 remote from the back-plate 3. The lugs 52, 53 are formed with axially aligned openings 54, 55. The opening 54 is of open-ended key-hole outline to receive a thickening at the free end of the cable 36. The opening 55 comprises a tapped hole through which the cable 36 is passed and in which is screwed a fitting 56 forming an abutment for the free end of the casing 37. The fitting 56 is clamped against rotation with respect to the lug 53 by means of a lock-nut 57 having a cylindrical stem 58 clamped against the lug 53 at its free end. An annular space surrounding the stem 58 and defined between the head of the nut 57 and the lug 53 receives a bead or thickening 59 of a flexible dirt excluding boot 60 through which the cable 36 extends.

In the modified construction illustrated in FIG. 10 the lock-nut 57 is of hexagonal outline and an annular groove 61 is machined in the lock-nut to receive the bead or thickening 59.

In the construction illustrated in FIGS. 11 and 12 the lugs 52 and 53 are replaced by apertured fittings 62 and 63. The fitting 62 comprises a head 64 having an open-ended key-hole shaped opening 65 for receiving and forming an anchorage for a thickening at the free end of the cable 36. The head 64 is carried by a knurled stem 66 which is a press fit in a complementary opening in the outermost side wall of the tappet 6. The fitting 63 is of similar construction comprising an apertured head 67 carried by a knurled stem 68 which is a press fit in a complementary opening at the outermost side wall of the tappet 7.

In the embodiment of FIG. 13 the stem 68 is threaded and is screwed into a tapped hole in the outermost side wall of the tappet 7. A lock-nut 69 clamps the fitting 63 against rotation with respect to the tappet 7.

I claim:

1. An internal shoe-drum brake comprising a rotatable drum, arcuate shoes carrying friction linings for engagement with said drum and having spaced actuated ends and spaced non-actuated ends, an actuator for separating said actuated ends to apply the brake, a pair of separable tappets incorporated in said actuator and acting on said actuated ends, expander means for separating said tappets, an adjuster with which said non-actuated ends engage and adapted to adjust the spacing between said non-actuated ends to compensate for wear of said friction linings, transmission means for operating said adjuster, and means directly responsive to the relative movement between said tappets for actuating said transmission means whereby said adjuster is operated to adjust the spacing between the non-actuated ends of the shoes solely in response to excess relative movement of said tappets in the application of said brakes.

2. An internal shoe-drum brake as claimed in claim 1, wherein said actuator comprises a housing in which said tappets are slideably guided, said means directly responsive to the relative movement between said tappet means comprising means directly connecting said transmission means to said tappets.

3. An internal shoe-drum brake as claimed in claim 1, wherein said expander means comprises a rotatable cam.

4. An internal shoe-drum brake as claimed in claim 1, wherein said transmission means comprises a flexible inextensible member connected between said tappets and having a free end adapted to operate said adjuster to compensate for wear of said friction linings when movement of the said member exceeds a predetermined value.

5. An internal shoe-drum brake as claimed in claim 4, wherein said inextensible member comprises an inextensible cable assembly.

6. An internal shoe-drum brake as claimed in claim 1, wherein said adjuster incorporates a pair of abutment members for engagement with said non-actuated ends, adjusting means for urging said abutment members in opposite direction to compensate for wear of said friction linings, and a threaded worm wheel rotatable in response to movement of said transmission means for operating said adjusting means.

7. An adjuster for the shoes of an internal shoe-drum brake comprising a rotatable drum, arcuate shoes for carrying friction linings for engagement with said drum and having spaced actuated ends and spaced non-actuated ends, an actuator for separating said actuated ends to apply the brake, and an adjuster with which said non-actuated ends engage and adapted to adjust the spacing between said non-actuated ends to compensate for wear of said friction linings, said adjuster comprising a housing adapted to be mounted on said back-plate between said non-actuated shoe-ends, a screw-threaded assembly located within said housing and adapted to act on said non-actuated shoe-ends, and adjusting means for increasing the effective length of said assembly to compensate for wear of said friction linings, said adjusting means comprising a worm meshing with said screw-threaded assembly and rotatable within said housing, an adjuster member rotatable relative to said worm in the application of said brake from an initial datum position and coupled thereto by a clutch plate keyed to said worm and relative to which said adjuster member is rotatable in one direction, resilient means for urging into engagement interengaging teeth in adjacent faces at said adjuster member and said clutch plate, the spacing between adjacent pairs of teeth corresponding to braking clearances, and energy storing means for returning said adjuster member to said initial datum position at the termination of the brake application, rotating said worm to increase the effective length of said assembly if the movement of said adjuster member with respect to said clutch plate has exceeded the spacing between adjacent teeth.

8. An adjuster as claimed in claim 7, wherein said adjuster member comprises a drum rotatable in response to an inextensible transmission member anchored thereto and adapted to sense displacement of said shoes in the application of said brake, and said energy storing means comprises a spring acting between said transmission member and a relatively fixed part.

9. An adjuster as claimed in claim 7, wherein said clutch plate and said worm are movable in an axial direction away from said adjuster member upon manual rotation of said worm with respect to said screw-threaded assembly by the engagement of a shoulder on said worm with said clutch plate until said worm engages with a stop whereafter further rotation of said worm in the same direction causes relative rotation of said members of the screw-threaded assembly to decrease the effective length thereof.

10. An adjuster as claimed in claim 9, wherein said clutch plate is mounted for sliding movement on a splined extension of said worm which is of reduced diameter, and said shoulder comprises a step at the change in diameter between said splined extension and said worm.

11. An adjuster as claimed in claim 9, wherein the end of said worm remote from said clutch plate is accessible from one end of said housing and is adapted for engagement by a tool by means of which said worm can be rotated manually.

12. An adjuster as claimed in claim 7, wherein said housing is threaded and incorporates a first member, and a second member, said first member having first and second threaded portions arranged to co-operate with said threaded housing and with said second member respectively, and said threaded portions being constructed and arranged such that, when said first member is rotated relative to said housing and said second member, said first member and said second member move oppositely relative to said housing to affect adjustment, and wherein said first member is provided with gear teeth for engagement with drive means for effecting rotation of said members as adjustment takes place, and the length of said gear teeth is chosen to maintain said teeth in engagement with said drive means throughout a maximum range of adjustment.

* * * * *